US006631107B1

(12) United States Patent
Ito et al.

(10) Patent No.: US 6,631,107 B1
(45) Date of Patent: Oct. 7, 2003

(54) METHOD AND APPARATUS FOR INFORMATION RECORDING MEDIUM

(75) Inventors: Tamotsu Ito, Ayase (JP); Toshihiro Kato, Yokohama (JP); Susumu Yoshida, Kawasaki (JP); Kensei Hayakawa, Fujisawa (JP); Akira Okushi, Ohmiya (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/653,923

(22) Filed: Sep. 1, 2000

(30) Foreign Application Priority Data

Aug. 3, 2000 (JP) ........................................ 2000-240359

(51) Int. Cl.[7] .................................................. G11B 7/00
(52) U.S. Cl. .................... 369/53.2; 369/47.1; 369/53.41
(58) Field of Search ............................ 369/47.1, 47.11,
369/47.15, 47.16, 47.21, 53.1, 53.2, 53.41,
59.1, 275.4

(56) References Cited

U.S. PATENT DOCUMENTS

| 5,390,159 A | | 2/1995 | Schylander |
| 5,546,365 A | | 8/1996 | Roth |
| 5,825,726 A | | 10/1998 | Hwang et al. |
| 5,905,709 A | * | 5/1999 | Blaukovitsch ........... 369/275.4 |
| 6,134,626 A | * | 10/2000 | Inokuchi et al. ................ 711/4 |
| 6,272,081 B1 | * | 8/2001 | Murata ..................... 369/47.15 |
| 6,304,531 B1 | * | 10/2001 | Koudo et al. ............ 369/47.23 |

FOREIGN PATENT DOCUMENTS

| EP | 0437093 A2 | 7/1991 |
| FR | 2732497 A1 | 10/1996 |
| GB | 2344925 A | 6/2000 |

* cited by examiner

*Primary Examiner*—Muhammad Edun
(74) *Attorney, Agent, or Firm*—Townsend and Townsend and Crew LLP

(57) ABSTRACT

Write-once read-many disks have a directory for file management in every session and files existing in other sessions can be managed in this directory. For write-once read-many disks for music use, however, there is no directory for file management and it has been impossible to access a session and reproduce music in other session. The present invention enables music CDs to take full advantage of multisession recording and realizes multisession-formatted music CDs wherein TOCs (Table of Contents) are recorded in the lead-in areas of the multiple sessions, each TOC in which the information for managing pieces of music (tracks) in other sessions has been registered.

19 Claims, 4 Drawing Sheets

SYSTEM STRUCTURE DIAGRAM

MULTISESSION RECORDING FORMAT

LAST SESSION SEARCH FLOW

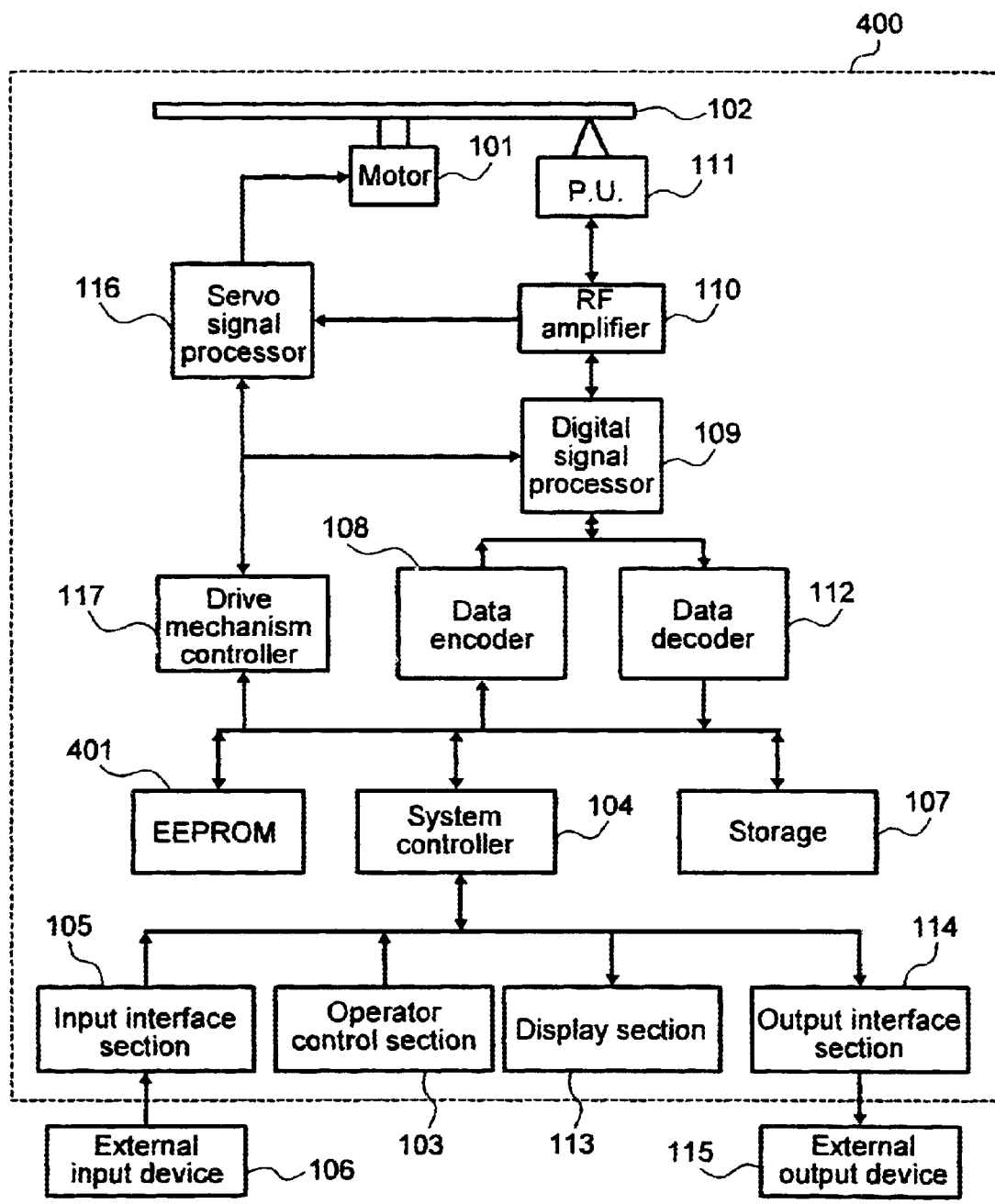

METHOD AND APPARATUS FOR INFORMATION RECORDING MEDIUM

CROSS-REFERENCES TO RELATED APPLICATIONS

The present application is related to and claims priority from Japanese Patent Application No. 00-240359, filed Aug. 3, 2000.

BACKGROUND OF THE INVENTION

The present invention relates to an information recording medium and recorder/reproducer equipment using such medium.

As optical disks for music use, music CDs (Compact Discs) are available that are made by using an optical disk with a diameter of 12 cm (or 8 cm).

These optical disks are available with three types: replay only type (read only memory (ROM): additional recording is impossible), write-once read-many type (additional recording is possible only once), and rewritable type (erasure and recording are possible repeatedly).

Music CDs are primarily the replay only type and data is recorded thereon in order of lead-in area, program area, and lead-out area. Music is stored into a program area in units of pieces of music (area into which one piece of music is to be recorded is called a track) and a plurality of pieces of music (a plurality of tracks) is recorded in a program area. In the lead-in area, TOC (Table of Contents) is recorded to manage the plurality of pieces of music (the start addresses of the pieces of music in the program area are registered therein). By reading the TOC, an optional piece of music can be reproduced from among the pieces of music recorded in the program area.

A multisession recording method is applied to write-once read-many CDs for handling data files to compensate for an intrinsic drawback of these CDs that additional recording is possible just only once. Many kinds of CD-R (Compact Disc-Recordable) drives that support this multisession recording method have been released and put on the market.

On a CD on which data has been recorded by the multisession recording method, a plurality of sessions exist, each of which comprising a lead-in area, a program area, and a lead-out area arranged in this order. In the lead-in area of each session, the start address of the next session's program area is recorded and algorithm is designed such that the sessions are accessed sequentially, thereby reaching the last session.

Write-once read-only CDs to handle data files have a directory for managing files in every session and files existing in other sessions can be managed under this directory.

However, write-once read-only CDs for music use do not have the directory for managing files and it has been impossible to use them satisfactorily with multisession. Specifically, after music information is recorded onto these CDs, once the sessions of CD have been finalized and closed, additional recording is impossible in spite of free area existing.

In the foregoing prior art, multisession recording is satisfactorily effective for write-once read-only CDs (CDs-R for data use) for handling data files. For these CDs, a directory for managing files exists in every section and files existing in other sessions can be managed under this directory.

On the other hand, multisession recording is not effective for write-once read-only CDs for music use, because these CDs do not have the directory for managing files. Thus, it has been impossible that music information in other sessions be managed and reproduced from a session.

An object of the present invention is to provide a CD for music use that can be used so as to take full advantage of multisession recording and a recorder and/or a reproducer using such CD.

SUMMARY OF THE INVENTION

The present invention allows music information to be recorded in multisession format onto an information recording medium. In a music CD onto which music data has been recorded in multisession format according to the present invention, in TOC (Table of Contents) in the lead-in area of one of the multiple sessions of the CD, information for managing pieces of music (tracks) in other sessions is also to be registered.

When data is recorded in multisession format onto an information recording medium, information for managing tracks that are being recorded in a session is registered into TOC (Table of Contents) of the session, and at the same time, information for managing some tracks recorded in other sessions is also optionally selected and registered into the TOC.

A recorder according to the present invention can record music data in multisession format onto an information recording medium as described above.

Then, when information is reproduced from the information recording medium onto which data has been recorded in multisession format according to the invention, sorting is carried out, based on the information for managing tracks from the TOC of the session from which information is to be reproduced and reproduction is carried out, based on the result of the sorting.

When information is reproduced from the information recording medium onto which data has been recorded in multisession format according to the invention, track numbers beginning with 1 (new track numbers to be assigned are to be called logical track numbers, which also applies to the remaining part of the specification) are assigned to the tracks managed in the TOC of the session from which information is to be reproduced, based on the information for managing the tracks from the TOC. After sequence in which the tracks are replayed is determined and reproducing process is carried out, when the logical track numbers of the tracks to be replayed may be displayed on the display section or output to an external display device. Furthermore, based on the set logical track numbers, user setting of programming and replay and reproducing process according the programming and replay can also be performed.

A reproducer according to the present invention is to be able to carry out the above sorting and logical number assignment, based on the information for managing tracks from the TOC of an arbitrary session of the information recording medium onto which music data has been recorded in multisession format as described above, and execute reproducing process by using the logical numbers of the tracks.

BRIEF DESCRIPTION OF THE DRAWINGS

The teachings of the present invention can be readily understood by considering the following detailed description in conjunction with the accompanying drawings:

FIG. 4 is a block diagram of the information recorder/reproducer equipment of another embodiment of the invention.

DESCRIPTION OF THE EMBODIMENTS

Using the drawings for reference, a preferred embodiment of the present invention will be explained below.

Figure 1:
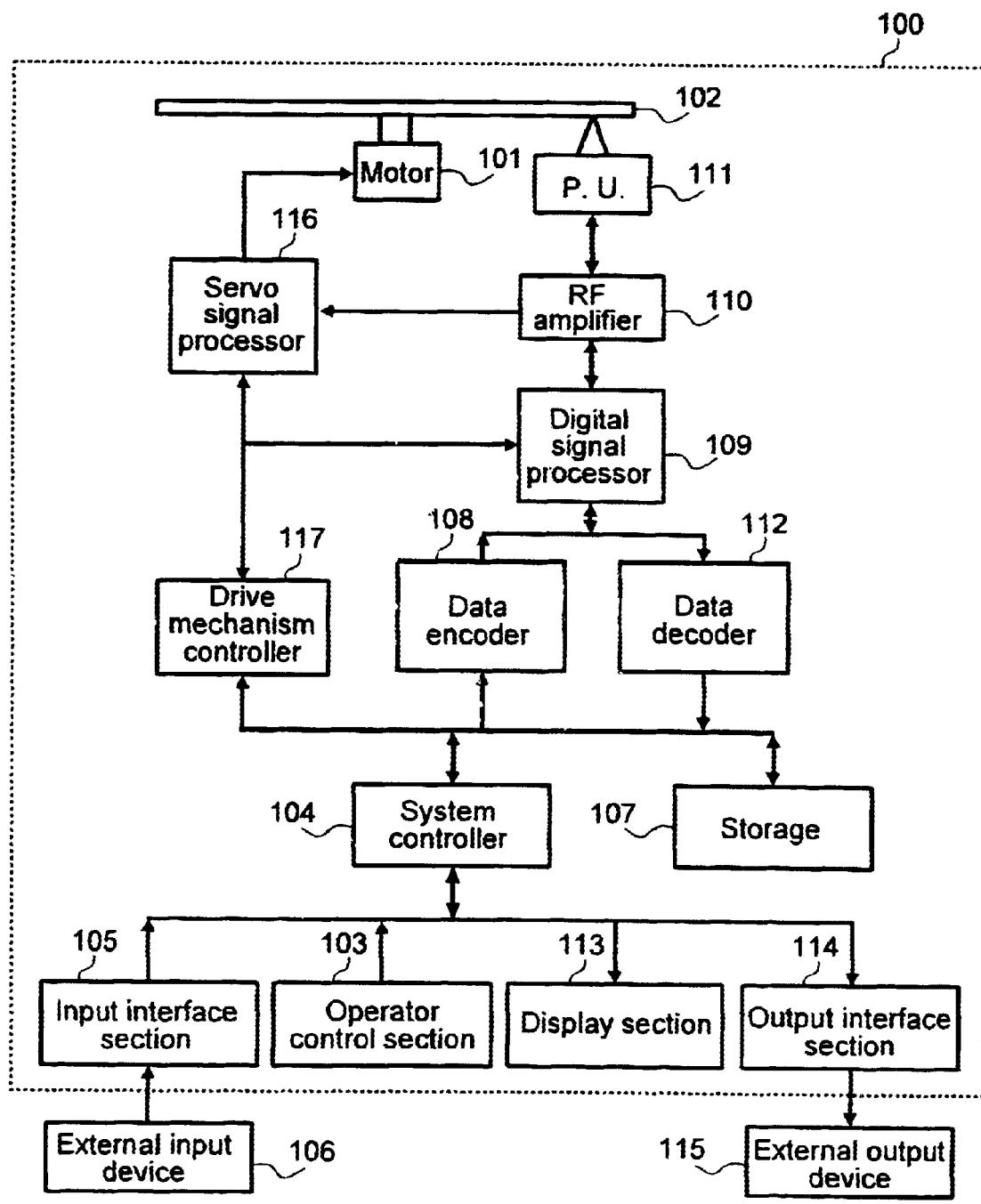
FIG. 1 is a block diagram of the information recorder/reproducer equipment configured according to the present invention.

FIG. 1 is a block diagram showing the structure of the blocks of aural signal recorder/reproducer equipment into which an aural signal recorder and an aural signal reproducer according to the present invention are integrated.

The aural signal recorder/reproducer equipment 100 executes the operation of recording into an optical disk 102 set on a motor 101 and the operation of reproducing from the optical disk 102 set thereon.

Data flow during the recording operation is as follows. A system controller 104 receives a recording start request from an operator control section 103. Under the control of the system controller 104, aural signals (digital aural signals) input from an external input device 106 via an input interface section 105 are stored into storage 107 and the stored input data is, after processed through an data encoder 108, sent via the digital signal processor 109 and a high-frequency amplifier (RF amplifier) 110 to a laser pickup (P. U.) 111 that records the data into the optical disk 102 set on the motor 101.

If the external input device 106 is, for example, a microphone that makes analog aural signal inputs, A/D (Analog to Digital) conversion is performed in the input interface section 105 and the inputs as digital signals are stored into the storage 107. Besides, digital aural signals can be input to the input interface section 105 by using optical cables.

Data flow during the reproducing operation is as follows. Data recorded onto the optical disk 102 set on the motor 101 is read by the laser pickup (P. U.) 111 and sent through the high-frequency amplifier (RF amplifier) 110 and the digital signal processor 102 to a data decoder 112. Under the control of the system controller, digital data outputs from the data decoder 112 are sent to a display section 113 or an output interface section 114 and output to an external output device 115.

If the external output device 115 must make analog aural signal outputs (connected to a speaker or the like), D/A (Digital to Analog) conversion is performed in the output interface section 114 and analog aural signals are output thereto. Besides, digital aural signals can be output from the output interface section 114 by using optical cables.

A servo signal processor 116 under the control of a drive mechanism controller 117 generates servo signals, based on the signals from the high-frequency amplifier 110 and controls the motor 101. The drive mechanism controller 117 controls the servo signal processor 116 and the digital signal processor 109 and carries out drive control in the aural signal recorder/reproducer equipment 100.

Although the display 113 in the present preferred embodiment displays the information on reproduced data (including track numbers, time elapsed from the beginning of a track, remaining time of a track, etc.), it can be used to monitor data from the external input device 106 (for sound pressure level change for each channel, over-level input detection, and others).

Furthermore, the display section 113 can be used to display CD TEXT information which will be described later.

In addition to the display section 113, another external display device, not shown in FIG. 1, may be connected to the equipment and used for display. On an additional display, if available, the detailed information of the CD TEXT information which will be described later can be displayed and a screen for selection allowing the user to make easy selection with a cursor or the like can be provided.

Not only a microphone, any device that can output aural signals and audio information to the aural signal recorder/reproducer equipment 100 (for example, a broadcast receiving tuner) can be used as the external input device 106.

An audio output device such as a speaker as well as an audio amplifier can be used as the external output device 115.

By using a CD player as the external input device and integrating the CD player into the recorder/reproducer equipment 100, a CD dubbing system using optical disks can be constructed.

Furthermore, CD dubbing equipment with its recorder and reproducer placed in a same housing can be constructed.

Because rewriting in a same location on a write-once read-many disk is impossible, a recording process specific to such disk is necessary. To implement this recording process, the multisession recording method is applied.

Figure 2:
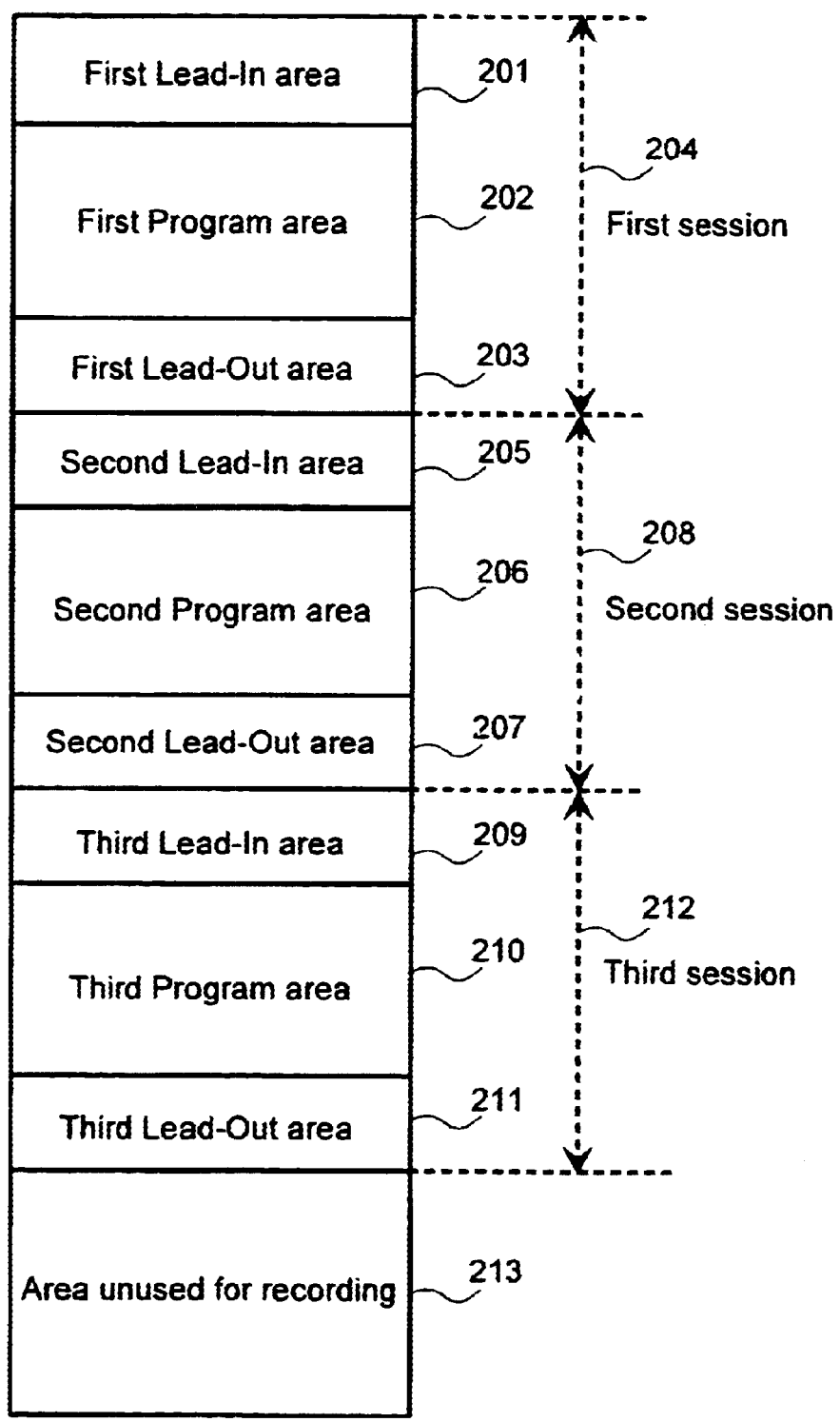
FIG. 2 is a diagram for illustrating the data structure of an optical disk onto which music data has been recorded in multisession format according to the invention.

FIG. 2 shows the internal areas of a disk on which data has been recorded in multisession recording format.

FIG. 2 shows the state of the disk with three sequential sessions in which data has been recorded.

The structure of the multisession recording format is such that a plurality of sessions exist, each of which has a pair of read-in and read-out areas.

Three areas, a first lead-in area 201, a first program area 202, and a first lead-out area 203 constitute a first session 204. Three areas that are a second lead-in area 205, a second program area 206, and a second lead-out area 207 constitute the next session (a second session) 208. Moreover, the next session begins with a third lead-in area 209 followed by a third program area 210 and a third lead-out area 211 at which the last session (third session) 212 becomes complete.

Data is recorded in order such that necessary tracks are recorded sequentially in the program areas, while TOC is recorded in each lead-in area and lead-out data is recorded in each lead-out area when each session is closed (the session becomes complete), and the sessions thus will be complete.

In the lead-in area of each session, TOC has been recorded in which the start addresses of the tracks recorded in the program area of the session and the start address of the program area of the next session are registered.

Table 1 lists the contents of the TOCs of sessions in a case where data has been recorded, according to the conventional multisession recording method.

Here, the information that is given in Table 1 is to be recorded onto the disk.

TABLE 1

Contents of the TOCs of sessions (1)

| Session number | Track number | Track start address |
|---|---|---|
| 1 | 1 | 00:02:00 |
|   | 2 | 02:34:56 |
|   | 3 | 05:43:21 |
| 2 | 4 | 28:55:70 |
|   | 5 | 31:39:44 |
|   | 6 | 35:21:13 |
| 3 | 7 | 59:04:68 |
|   | 8 | 62:16:37 |

In the TOC of the first session, the track start addresses of the tracks (1, 2, 3) recorded in the program area (first program area) of the session are registered. In the TOC of the second session, the track start addresses of the tracks (4, 5, 6) recorded in the program area (second program area) of the session are registered. Furthermore, in the TOC of the third session, the track start addresses of the tracks (7, 8) recorded in the program area (third program area) of the session are registered.

Therefore, the tracks managed in each session are limited to those tracks recorded in the program area of that session.

Tables 2 though 11 are the ones for explaining the preferred embodiment of multisession recording according to the present invention. In the present embodiment of the invention, CD TEXT is used to identify the recorded pieces of music more easily.

The contents of CD TEXT to be registered in TOC are text information about the tracks. For example, the title of a piece of music recorded in track, the name of its player, and the name of its composer are registered as CD TEXT. Of course, management is also possible only with track numbers without using CD TEXT.

Information that will be given in Tables 2 though 11 may be displayed on the display section 113, or alternatively, the detail of CD TEXT information can be displayed on an external display device.

When the first session becomes complete, other sessions do not exist. Therefore, in the TOC of the first session, the track start addresses of the tracks (1, 2, 3) recorded in the first program area and the CD TEXT information for the tracks (title name "A" of track 1, title name "B" of track 2, title name "C" of track 3) are registered.

Table 2 lists the contents of the TOC of the first session and the contents of the TOC that will be recorded in the lead-in area of the second session upon the completion of recording track 4 (title name "D"), track 5 (title name "E"), and track 6 (title name "F") into the program area of the second session.

Here, the information that is given in Table 2 is to be recorded onto the disk.

TABLE 2

Contents of the TOCs that may be displayed (1)

| Pieces of music managed in second session | | Pieces of music recorded in first sessions | |
|---|---|---|---|
| Track number | Title | Track number | Title |
| 4 | D | 1 | A |
| 5 | E | 2 | B |
| 6 | F | 3 | C |

If the above contents can be set intact, the TOC in which the pieces of music managed in the second session have been registered as given in Table 2 is recorded in the second lead-in area of the second session when the session is closed.

Table 3 lists the information for managing the tracks 4, 5, and 6 recorded in the program area of the second session on the assumption that the information has been read from the TOC and written into the storage 107 of the aural signal recorder/reproducer equipment 100. In Table 3, also, logical track numbers 1, 2, and 3 are newly assigned to the tracks 4, 5, and 6, respectively. The equipment carries out the reproducing process, while referring to such information written into the storage 107 as will be given in Table 3, when the sequence in which the tracks are replayed is determined, based on the logical track numbers.

TABLE 3

| Logical track number | Logical track numbers | |
|---|---|---|
| | Pieces of music managed in second session | |
| | Track number | Title |
| 1 | 4 | D |
| 2 | 5 | E |
| 3 | 6 | F |

By means of these logical track numbers, the tracks 4, 5, and 6 can be replayed as if they were new tracks 1, 2, and 3. This produces such effect of convenience of use that the user feels as if the tracks were replayed from a single session, that is, the user can replay the tracks, knowing that the number of tracks is three, as the logical tracks 1, 2, and 3 can be displayed, not giving the user a sense of incongruity. For example, when specifying pieces of music by programming and replay, the sequence in which the pieces of music are reproduced can be set, based on the logical track numbers. Of course, reproduction can also be performed, according to the setting of programming.

Table 4 lists the contents of the TOCs of the first and second sessions in an example case of embodiment where the track 2 of the first session is added to the TOC for the pieces of music to be managed in the second session (the pieces of music that can be reproduced when the second session is selected).

Here, the information that is given in Table 4 is to be recorded onto the disk.

TABLE 4

Contents of the TOCs that may be displayed (2)

| Pieces of music managed in second session | | Pieces of music recorded in first sessions | |
|---|---|---|---|
| Track number | Title | Track number | Title |
| 4 | D | 1 | A |
| 5 | E | 2 | B |
| 6 | F | 3 | C |
| <2> | <B> | | |

Although the track 2 added to the TOC of the second session is manually specified as requested from the user in this case, an automatic manner is also taken in which internal processing can add the information for all tracks in the preceding session to the TOC of the next session.

Once the TOC of the second session, containing the pieces of music to be managed in the second session as given in Table 4, has been recorded in the lead-in area of the second session, the management of the second session can also manage the track 2 recorded in the first program area of the first session in addition to the tracks 4, 5, and 6, though the tracks 4, 5, and 6 are merely recorded in the second program area.

In consequence, when the second session is selected, four pieces of music in the tracks 4, 5, 6, and 2 can be reproduced.

(To distinguish a track of another session added to the TOC of the session of interest so as to be managed in the session from the tracks recorded in the session, its track number and title are enclosed by angle brackets < >, for example, <2 > <B> in the above Table. This way of notation also applies to Tables that will appear in the remaining part of this specification.)

The pieces of music managed in the second session can be reproduced after being sorted, based on their track numbers. Specifically, the sequence in which they are reproduced may be either an ascending order of track numbers 2, 4, 5, and 6 or inversely a descending order of track numbers 6, 5, 4, and 2. Alternatively, sorting can be performed, based on the absolute addresses of the tracks instead of the track numbers. The absolute addresses are uniquely given positional information indicating the recording location of an item of information recorded on the disk. (For example, the track start addresses given in Table 1 correspond to the absolute addresses of the tracks.)

Table 5 concerns the above case of embodiment where the track 2 of the first session is added to the TOC for the pieces of music to be managed in the second session, on the assumption that the track numbers are sorted in order of 2, 4, 5 and 6 as specified by the user and assigned logical track numbers 1, 2, 3, and 4, respectively, in order to set the sequence in which the tracks are replayed.

Here, the information that is given in Table 5 is to be written into the storage 107.

TABLE 5

Logical track numbers and sequence in which the pieces of music are reproduced

| Logical track numbers and sequence in which the pieces of music are reproduced | | | Pieces of music managed in second session | | Pieces of music recorded in first session | |
|---|---|---|---|---|---|---|
| Logical track number | Track number | Title | Track number | Title | Track number | Title |
| 1 | <2> | <B> | 4 | D | 1 | A |
| 2 | 4 | D | 5 | E | 2 | B |
| 3 | 5 | E | 6 | F | 3 | C |
| 4 | 6 | F | <2> | <B> | | |

The equipment carries out the reproducing process, while referring to such information written into the storage element as given in Table 5 above, when the sequence in which the tracks are replayed is determined, based on the logical track numbers.

By means of logical track number assignment, the tracks 2, 4, 5, and 6 can be replayed as if they were tracks 1 to 4. This produces such effect of convenience of use that the user feels as if the tracks were replayed from a single session, as described above regarding Table 3. In this case, furthermore, the track numbers 2, 4, 5, and 6 that are not successive change to new serial track numbers 1 to 4, so that the user can perform natural operation when replaying the tracks (the serially numbered tracks are displayed, allowing the user to specify a track or tracks to be replayed). Alternatively, the user can also specify and set a reverse order of sorting the tracks, that is, the logical track numbers 4 to 1 corresponding to the track numbers 6, 5, 4, and 2.

Table 6 lists the contents of the TOC of the third session that will be recorded in the lead-in area of the third session as well as the contents of the TOCs of other sessions when track 7 (title "G") and track 8 (title "H") have just been recorded in the program area of the third session.

Here, the information that is given in Table 6 is to be recorded onto the disk.

TABLE 6

Contents of the TOCs that may be displayed (3)

| Pieces of music managed in third session | | Pieces of music recorded in other sessions | |
|---|---|---|---|
| Track number | Title | Track number | Title |
| 7 | G | 1 | A |
| 8 | H | 2 | B |
| | | 3 | C |
| | | 4 | D |
| | | 5 | E |
| | | 6 | F |

Table 7 lists the contents of the TOCs in an example case of embodiment where the track 3 of the first session and the track 5 of the second session are added to the TOC for the pieces of music to be managed in the third session (the pieces of music that can be reproduced when the third session is selected).

Here, the information that is given in Table 6 is to be recorded onto the disk.

TABLE 7

Contents of the TOCs that may be displayed (4)

| Pieces of music managed in third session | | Pieces of music recorded in other sessions | |
|---|---|---|---|
| Track number | Title | Track number | Title |
| 7 | G | 1 | A |
| 8 | H | 2 | B |
| <5> | <E> | 3 | C |
| <3> | <C> | 4 | D |
| | | 5 | E |
| | | 6 | F |

Once the TOC in which the pieces of music managed in the third session are registered as given in Table 7 has been recorded in the lead-in area of the third session, the management of the third session can also manage the track 3 recorded in the first program area of the first session and the track 5 recorded in the second program area of the second session in addition to tracks 7 and 8, though the tracks 7 and 8 are merely recorded in the third program area.

In consequence, when the third session is selected, four pieces of music in the tracks 7, 8, 5, and 3 can be reproduced.

Let us suppose that a dubbing system executes dubbing from a disk having the recorded tracks in the sessions as given in Table 6 to another disk, when the title "E" is added to the third session. When attempting to dub the third session, the dubbing system can detect that the music piece with the title "E" has been recorded in the track 5 in the second session of the dubbing-to-disk, according to the CD TEXT information for the title "E" in the dubbing-from-disk. Thus, the dubbing system only adds the control information for the track 5 to the TOC of the third session of the dubbing-to-disk without recording the track 5 in the third program area of the third session. In consequence, it can be realized that three pieces of music in the tracks 7, 8, and 5 be reproduced when the third session is selected as if the title "E" was additionally recorded in the third session.

This processing can be carried out so as to be transparent to the user, or alternatively the selection of titles to be added to the sessions can positively be committed to the option of the user.

Although a piece of music is identified only by its title in this example case of embodiment, it may be identified by using part of or the whole of CD TEXT information.

Alternatively, a piece of music can be identified by using the replay time of its track instead of using CD TEXT. Because there is little probability of different pieces of music having exactly the same replay time, no problem may arise in practical operation.

Table 8 lists the contents of the TOCs, concerning an example case of embodiment where the tracks 4 and 5 from the second session with the track 5 being deleted therefrom and the tracks 1 and 2 from the first session with the track 3 being deleted therefrom are added to the TOC for the pieces of music to be managed in the third session (the pieces of music that can be reproduced when the third session is selected).

Here, the information that is given in Table 8 is to be recorded onto the disk.

TABLE 8

Contents of the TOCs intended for dubbing of the third session to which the tracks from other sessions are added with the exception of unwanted tracks

| Pieces of music managed in third session | | Pieces of music recorded in other sessions | |
|---|---|---|---|
| Track number | Title | Track number | Title |
| 7 | G | 1 | A |
| 8 | H | 2 | B |
| <4> | <D> | 3 | C |
| <6> | <F> | 4 | D |
| <1> | <A> | 5 | E |
| <2> | <B> | 6 | F |

Once the TOC in which the pieces of music managed in the third session are registered as given in Table 8 has been recorded in the lead-in area of the third session, the management of the third session can also manage the tracks 4 and 6 recorded in the second program area of the second session and the tracks 1 and 2 recorded in the first program area of the first session in addition to the tracks 7 and 8, though the tracks 7 and 8 are merely recorded in the third program area.

In consequence, when the third session is selected, six pieces of music in the tracks 7, 8, 4, 6, 1, and 2 can be reproduced.

Table 9 is intended for explaining the sequence in which the pieces of music are recorded onto a recording medium and reproduced therefrom on the assumption that dubbing of the tracks in the third session is attempted in order of tracks 7, 5, 3, and 8.

Here, such information as will be given in Table 9 is to be recorded onto the disk as the result of the recording process. On the other hand, when the reproducing process is carried out, the information as will be given in Table 9 is read from the disk and written into the storage 107. In the following description of the embodiment, however, it is assumed that the information for managing the tracks of the "pieces of music recorded in other sessions" has been read from the disk and written into the storage 107 beforehand.

Therefore, the equipment executes both recording and reproducing processes, while referring to such information written into the storage 107 as will be given in Table 9. The sequence in which the tracks are replayed is determined, based on the logical track numbers.

TABLE 9

Sequence in which dubbing of the tracks of third session is attempted

| Sequence in which dubbing of the tracks of third session is attempted | | Pieces of music recorded in other sessions | |
|---|---|---|---|
| Track number | Title | Track Number | Title |
| 7 | G | 1 | A |
| <5> | <E> | 2 | B |
| <3> | <C> | 3 | C |
| 8 | H | 4 | D |
| | | 5 | E |
| | | 6 | F |

Information recorder/reproducer equipment configured in another preferred embodiment is shown in FIG. 4 where EEPROM 401 is added to the equipment configuration of the foregoing embodiment in FIG. 1.

When dubbing the track 7, the equipment refers to the information written into the storage 107 as given in Table 9 above and dubs the track 7 owing to that the track 7 has not been recorded in other sessions of the dubbing-to-disk.

Next, when attempting to dub the tracks 5 and 3, the equipment also refers to the information written into the storage 107 as given in Table 9 above, but does not dub the tracks 5 and 3 owing to that the tracks 5 and 3 has been recorded in other sessions of the dubbing-to-disk.

Furthermore, when dubbing the track 8, the equipment also refers to the information written into the storage 107 as given in Table 9 above and dubs the track 8 owing to that the track 8 has not been recorded in other sessions of the dubbing-to-disk.

The sequence in which the equipment attempts to dub the above tracks 7, 5, 3, and 8 is stored into the internal EEPROM 401 of the aural signal recorder/reproducer equipment 400.

In the TOC of the third session, the information for managing the tracks 7, 5, 3, and 8 is registered.

Although the information read from the disk is to be stored into the storage 107 in the above description, another storage element or storage medium may be used, not limited to the storage 107.

Then, when the equipment reproduces the pieces of music from the third session dubbed as described above, the above tracks 7, 5, 3, and 8 are replayed in the sequence stored into the internal EEPROM 401 of the aural signal recorder/reproducer equipment 400. According to the present embodiment, therefore, the tracks can be replayed in the sequence in which dubbing of the tracks has been attempted.

In the above description, the information that is stored into the internal EEPROM 401 of the aural signal recorder/reproducer equipment 400 contains the information for managing the recorded tracks, obtained during the process of dubbing onto the information recording medium. This information shall be stored so as to be associated with the sequence in which the equipment attempted to dub the tracks as described above.

By increasing the storage capacity of the internal EEPROM 401 of the aural signal recorder/reproducer equipment 400, it becomes possible to store different sequences in which dubbing of the tracks is attempted from a plurality of information recording media. In this case, a plurality of information recording media whose TOC is stored into the storage must be identified. As the information for identifying them, the contents of the TOC information including the information for managing the tracks can be used.

Although EEPROM is used as the storage medium in the present embodiment, the storage medium is not limited to EEPROM. Any nonvolatile storage element or medium such as a flash memory may be used. If a nonvolatile storage element or medium is used, it can continue to retain the information such as the sequence of dubbing described above in the event that the power supply to it is disrupted. However, even in a case where a volatile storage element or medium is used, the invention is still efficacious as described above as long as the above sequence of dubbing is stored therein.

If logical numbers are assigned to the tracks of the third session in Table 9, they are assigned, according to the sequence in which dubbing of the tracks is attempted.

Table 10 lists the contents of the TOCs in which local track numbers have been assigned to the tracks managed in the third session in accordance with the sequence of recording attempted in the third session.

TABLE 10

Sequence in which dubbing of the tracks is attempted and logical track numbers

| Logical track number in third session | | | Pieces of music recorded in other sessions | |
|---|---|---|---|---|
| Logical Logical track number | Track number | Title | Track number | Title |
| 1 | 7 | G | 1 | A |
| 2 | <5> | <E> | 2 | B |
| 3 | <3> | <C> | 3 | C |
| 4 | 8 | H | 4 | D |
| | | | 5 | E |
| | | | 6 | F |

Table 10 is on the assumption that the information for managing the tracks 7,5,3, and 8 in the third session has been read from the TOC and written into the storage 107 or the EPROM 401 of the aural signal recorder/reproducer equipment 400.

As given in Table 10, the logical track numbers are set in accordance with the sequence in which dubbing of the tracks managed in the third session is attempted. Consequently, the tracks 7, 5, 3, and 8 can be replayed as if they were tracks 1 to 4, which produces such effect of convenience of use that the user feels as if the tracks were replayed from a single session.

Table 11 lists the contents of the TOCs recorded in the lead-in areas of the sessions of the disk onto which music data has been recorded in multisession recording format according to the present invention.

Here, the information that is given in Table 11 is to be recorded onto the disk.

TABLE 11

Contents of TOCs of sessions (2)

| Session number | Track number | Track start address | Title |
|---|---|---|---|
| 1 | 1 | 00:02:00 | A |
| | 2 | 02:34:56 | B |
| | 3 | 05:43:21 | C |
| 2 | 4 | 28:55:70 | D |
| | 5 | 31:39:44 | E |
| | 6 | 35:21:18 | F |
| | <2> | <02:34:56> | <B> |
| 3 | 7 | 59:04:68 | G |
| | 8 | 62:16:37 | H |
| | <5> | <31:39:44> | <E> |
| | <3> | <05:43:21> | <C> |

By referring to Table 11, the equipment can know the pieces of music managed in the sessions.

In the preferred embodiment of the present invention, it is assumed that the reproducer is initially set to select the last session and reproduce the pieces of music managed in the last session.

Of course, the user can select an optional session.

The procedure for searching the last session will be explained below, using FIG. 2 for the multisession recording format and FIG. 3 for the flowchart.

In FIG. 2, in the first lead-in area 201 of the first session 204, a start address of the second program area 206 of the next session (second session) 208 is recorded, and in the second lead-in area of the second session 208, a start address of the third program area 210 of the last session (third session) 212 is recorded.

In the third lead-in area 209 of the last session (third session) 212, a start address of an additional program area (fourth program area) that is anticipated to be used if a further session (fourth session) is added in future.

Figure 3:
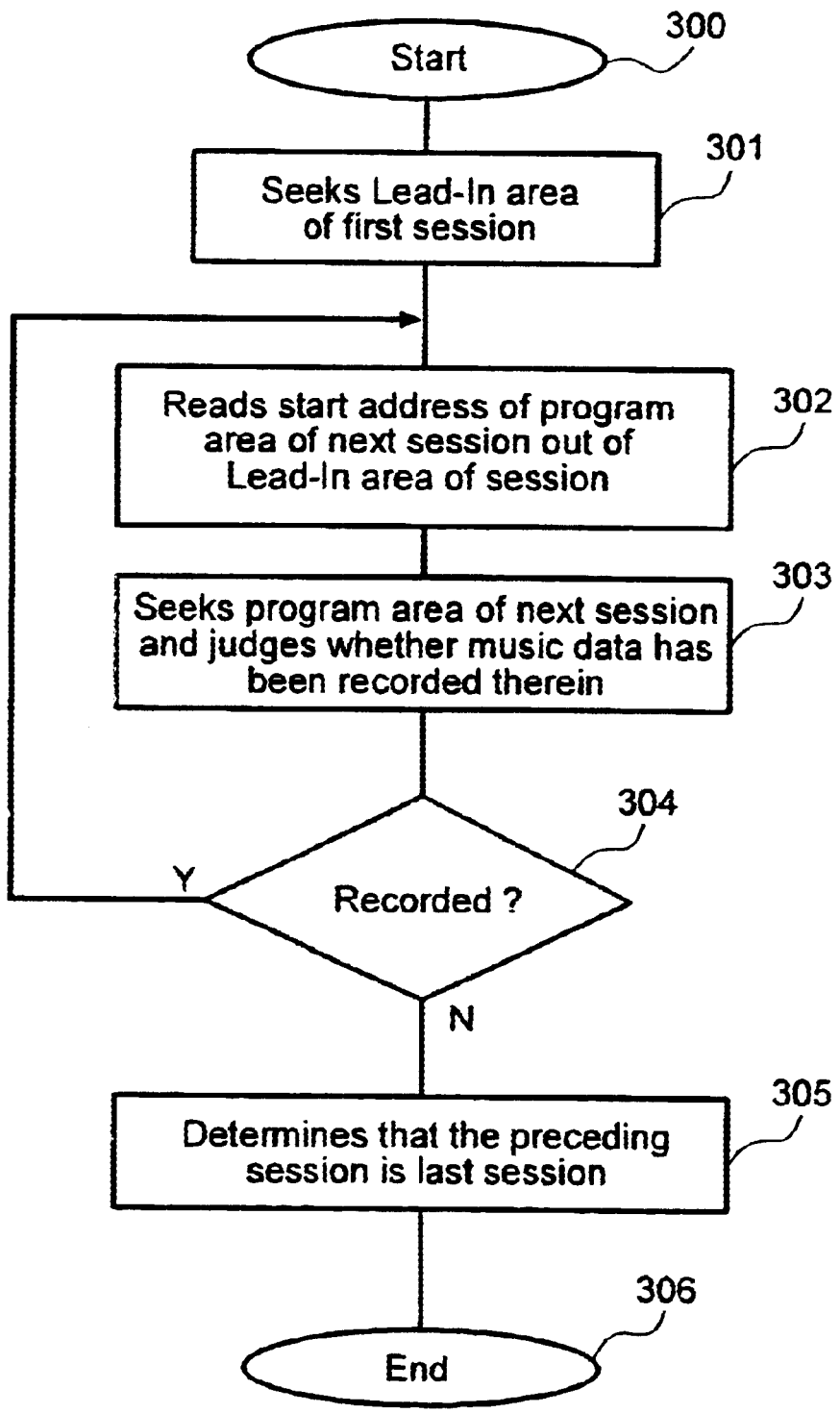
FIG. 3 is a flowchart for illustrating the algorithm of searching the last session.

The flow of searching starts with step 300 in FIG. 3 and the pickup moves to the first lead-in area 201 of the first session 204 in step 301. The pickup reads the start address of the second program area 206 of the next session (second session) 208 recorded in the lead-in area 201 of the first session 204 (step 302). Then, the equipment seeks the address and judges whether music data has been recorded in the program area (step 303) and proceeds to step 304.

In step 304, if music data has been recorded in the data recording area, the operation returns to step 302 where the pickup reads the start address of the third program area 210 of the next session (third session) 212 recorded in the lead-in area 205 of the second session 208 (step 302). Then, the equipment seeks the address and judges whether music data has been recorded in the third program area 210 (step 303) and proceeds to step 304. The equipment repeats this process from step 302 to step 304 until finding that no music data has been recorded in the program area. When the equipment finds that no music data has been recorded in the program area, it determines that the preceding session is the last session.

In step 304, if no music data has been recorded in the program area, operation proceeds to step 305. In the example shown in FIG. 2, the music data is recorded in three sessions. Thus, the equipment finds that no music data has been recorded in the program area when it seeks the start address, recorded in the third lead-in area 209, of the fourth program area that is anticipated to be used if the next session (fourth session) is added in future.

Consequently, the equipment determines that the preceding session (third session) 212 is the last session in step 305 and terminates the searching (step 306).

Following the flow described above, the equipment searches the last session.

In the present embodiment, the last session is regarded as being the latest state of the disk.

In the above step 302, the information for managing the tracks in the session may be stored, and thereby it can be reflected in the information for managing the tracks in the last session. By thus storing the information for managing the tracks in each session read before the last session is searched, the last session has the information for managing all tracks. Thus, in the last session, for example, the recording time of a track can be obtained by calculating the difference of its start address and the start address of the next track from the stored information for managing all tracks.

A session may be structured each time a track is recorded, which, however, decreases the efficiency of data area usage because a lead-in area and a lead-out area are recorded each time the session is structured.

Although a session is closed as requested from the user in the present embodiment, internal processing can close a session when the size of free area for recording becomes less than the size of lead-out area required when the session is closed.

Closing a session can be executed by an external personal computer.

To record TOC containing the CD TEXT information for the tracks in a session, the CD TEXT information must be retained until closing the session.

(CD dubbing can be performed without concerns because the CD TEXT information recorded on the dubbing-from-disk can be used as is.)

The CD TEXT information for the tracks in a session may be input when the session is closed, whereas each time a track is recorded, the CD TEXT information for the track may be input. The latter is preferable for the user.

The configuration shown in FIG. 4 is such that the EEPROM 401 is added to the configuration of embodiment shown in FIG. 1. The EEPROM 401 can be rewritten by normal writing operation and has the property that it retains the written data even if the power supply voltage becomes 0 V. Therefore, by writing the CD TEXT information into the EEPROM 401, a session can be closed optionally at any time.

Although EEPROM is used as the storage medium in the present embodiment, the storage medium is not limited to EEPROM. Any nonvolatile storage element or medium such as a flash memory may be used.

If a nonvolatile storage element or medium is used, it can continue to retain the above CD TEXT information in the event that the power supply to it is disrupted when the power is disconnected from the equipment. However, even in a case where a volatile storage element or medium is used, the invention is still efficacious as described above as long as the above CD TEXT information is stored therein.

An album name can be specified in CD TEXT. In the multisession recording format of the present embodiment, if album names are specified for the sessions of the disk, the album name assigned to the last session is regarded as being the album name of the disk.

The user can optionally select an album name of the disk from among the album names of different sessions, of course.

According to the present invention, music CDs can be used, taking full advantage of multisession recording, and TOCs (Table of Contents) are recorded in the lead-in areas of the multiple sessions of a multisession-formatted music CD. By virtue of the TOC of a session in which the information for managing pieces of music (tracks) in other sessions as well as the tracks in the session is registered conjointly, even the tracks that are not recorded in the session can also be managed in the session (reproduced from the session).

What is claimed is:

1. A music information recorder comprising;
   music-information-recording means for recording music information onto an information recording medium; and
   control means for controlling said music information recording means,
   wherein said control means is characterized in that, when recording music tracks in a plurality of sessions onto said information recording medium, information for managing one or more music tracks that are being recorded in one of said sessions is registered into a TOC (Table of Contents) of said one of said sessions and information for managing one or more music tracks recorded in another session is also registered into said TOC.

2. The music information recorder of claim 1 wherein the information for managing said one or more music tracks recorded in said other session is optionally selected.

3. The music information recorder of claim 1 further comprising:
music information reproducing means for reproducing music information from an information recording medium onto which music tracks have been recorded in a plurality of sessions; and
control means for controlling said music information reproducing means,
wherein the control means is characterized in that if a TOC of one of said sessions comprises information for managing one or more music tracks recorded in said one of said sessions and information for managing one or more music tracks recorded in another of said sessions, then said one or more music tracks in said other of said sessions can also be managed under said TOC.

4. The music information recorder of claim 3 further comprising a housing in which the music information recorder and the music information reproducer are disposed.

5. An information recording medium comprising:
music tracks recorded in a plurality of sessions; and
a TOC (Table of Contents) for one of said sessions, the TOC including information for managing one or more music tracks recorded in said one of said sessions and including information for managing one or more music tracks recorded in another of said sessions.

6. The information recording medium of claim 5 wherein the information for managing the tracks recorded in said other session is optionally selected.

7. A CD player comprising:
music-information-reproducing means for reproducing music information from an information recording medium onto which music tracks have been recorded in a plurality of sessions; and
control means for controlling said music-information-reproducing means,
wherein the control means is characterized in that if a TOC (Table of Contents) of one of said sessions comprises information for managing one or more music tracks recorded in said one of said sessions and information for managing one or more music tracks recorded in another of said sessions, then said one or more music tracks in said other of said sessions can also be managed under said TOC.

8. The CD player of claim 7 wherein when reproducing music information from an arbitrary session of said plurality of sessions, said CD player carries out sorting based on music-track numbers registered in a TOC of the arbitrary session and reproduces the music information in said arbitrary session in accordance with the sorting.

9. The CD player of claim 8 characterized in that after sorting music tracks managed in at least one of said sessions is carried out, serial-logical-track numbers starting from number 1 are assigned to said music tracks that have been sorted.

10. The CD player of claim 7 wherein when reproducing music information from an arbitrary session of said plurality of sessions, said CD player carries out sorting based on absolute addresses of music tracks registered in a TOC of the arbitrary session and reproduces the music information of said arbitrary session in accordance with the sorting.

11. The CD player of claim 10 characterized in that after sorting music tracks managed in at least one of said sessions is carried out, serial logical track numbers starting from number 1 are assigned to said music tracks that have been sorted.

12. The CD player of claim 7 wherein music information is reproduced in the order of serial-logical-track numbers starting from number 1 that are assigned to music tracks managed in a at least one of said sessions recorded subsequent to a first recorded session of said sessions.

13. The CD player of claim 7 characterized in that after sorting music tracks managed in at least one of said sessions recorded subsequent to a first recorded session of said sessions is carried out in an order specified by a user based on the information for managing the music tracks recorded in said least one of said sessions recorded subsequent to a first recorded session of said sessions, serial-logical-track numbers starting from the number 1 are assigned to said music tracks that have been sorted.

14. The CD player of claim 13 is further characterized by implementing dubbing from an information recording medium disposed in the CD player to another information recording medium disposed in a music information recorder, the music information recorder comprising:
music-information-recording means for recording music information onto said other information recording medium; and
control means for controlling said music information recording means,
wherein the control means is characterized in that, when recording music tracks in a plurality of sessions onto said other information recording medium, information for managing one or more music tracks that are being recorded in a one of said sessions on said other information recording medium is registered into a TOC of said one of said sessions on said other information recording medium and information for managing one or more music tracks recorded in another sessions said on said other information recording medium is also registered into said TOC of said one of said sessions on said other information recording medium.

15. The CD player of claim 14, characterized in that, when dubbing of a session from the information recording medium disposed in the CD player to the information recording medium disposed in the music information recorder is performed, if a track in said session of the information recording medium disposed in the CD player is dubbed to a session on the information recording medium disposed in the music information recorder, then information for managing the track is recorded in a TOC of said session on the information recording medium disposed in the music information recorder.

16. The CD player of claim 15 is characterized in that when dubbing a session from the information recording medium disposed in the CD player to the information recording medium disposed in the music information recorder, the music information recorder uses CD TEXT to determine whether a music track from the information recording medium disposed in the CD player is recorded on the information recording medium disposed in the music information recorder.

17. The CD player of claim 14 wherein, when dubbing a session from the information recording medium disposed in the CD player to the information recording medium disposed in the music information recorder, the music information recorder is configured to record a TOC and music tracks from the session for the information recording medium disposed in the CD player to a new session on the information medium disposed in the music information recorder, wherein the TOC for the new session includes information for tracks recorded in other sessions on the music information recording medium disposed in the music information recorder.

18. The CD player of claim 14, characterized in that, when dubbing a session from the information recording medium disposed in the CD player to the information recording medium disposed in the music information recorder, the music information recorder is configured to record a recording sequence of music tracks dubbed in a new session on the information medium disposed in the music information recorder, wherein the CP player is configured to reproduce the music tracks dubbed in the new session in the recording sequence.

19. The CD player of claim 18, characterized in that the music tracks dubbed in the new session are assigned serial-logical-track numbers, wherein a first music track dubbed in the new session is assigned the serial-logical-track number 1, a second music track dubbed in the new session is assigned the serial-logical-track number 2 and this numbering sequence is continued for all music tracks dubbed in the new session.

* * * * *